No. 777,690. PATENTED DEC. 20, 1904.
J. F. NEHER.
STONE SAW.
APPLICATION FILED DEC. 9, 1903.
NO MODEL.
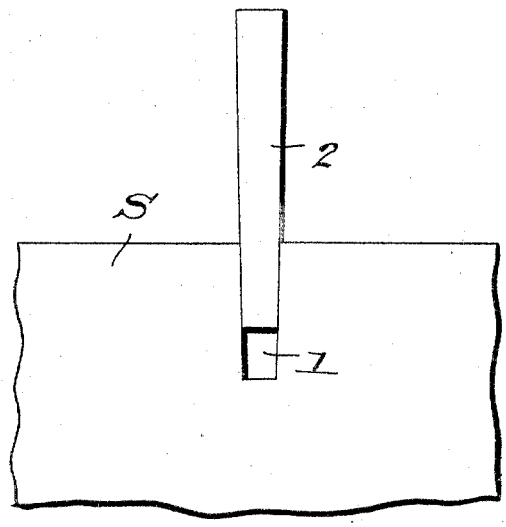
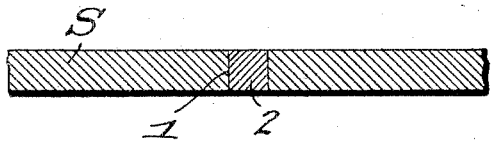

No. 777,690.

Patented December 20, 1904.

UNITED STATES PATENT OFFICE.

JOHN F. NEHER, OF GUTHRIE, OKLAHOMA TERRITORY.

STONE-SAW.

SPECIFICATION forming part of Letters Patent No. 777,690, dated December 20, 1904.

Application filed December 9, 1903. Serial No. 184,472.

*To all whom it may concern:*

Be it known that I, JOHN F. NEHER, a citizen of the United States, residing at Guthrie, in the county of Logan and Territory of Oklahoma, have invented a new and useful Stone-Saw, of which the following is a specification.

This invention relates to saws for use upon soft stone having sharp cutting grit, such as sandstone of different kinds. Owing to the sharpness of the grit in such stone, the wear upon the teeth of saws employed in cutting them is excessive, and if the saws are not provided with removable teeth, which may be replaced when worn out, the saws become useless in a very short time.

Various devices have been employed to prolong the life of saws used in cutting sandstone and other soft rock of similar character—such, for example, as supplementary strips having teeth attached thereto or formed integral therewith. These strips may be secured to the body of the saw and receive almost all the wear resulting from the use of the saw. When the teeth in such strips become so worn as to be no longer serviceable, the strips may be removed from the saw and others attached in place of those removed. This plan of renewing the saw-teeth is an improvement over the old method of using a saw until the teeth are worn out and then casting it aside; but the removable strips are not entirely satisfactory, for the reason that the wear upon the teeth is not always uniform and it is frequently desired to replace a few teeth which have become injured while the remaining teeth are still capable of rendering effective service.

The object of the present invention is to provide an improved form of saw for use upon sandstone in which the teeth are inserted in sockets in the edge of the saw itself and may be quickly removed and replaced by new teeth whenever it is desired to do so.

In describing the invention reference will be had to the accompanying drawings, in which there is shown one form of embodiment of the invention capable of carrying the same into practical operation, it being understood that changes in the exact form and manner of assemblage of the teeth and the saw may be resorted to without departing from the spirit of the invention.

In the drawings, Figure 1 is a view in side elevation of a fragment of the saw provided with the preferred form of tooth. Fig. 2 is a view in section through the saw and the inserted portion of the tooth.

Referring to the drawings, in which corresponding parts are designated by similar characters of reference, S designates a portion of saw-blade provided with sockets 1, disposed perpendicular to the edge of the saw and tapered very slightly from the mouth to the bottom. The sockets 1 are formed with flat sides and are adapted to receive saw-teeth 2 of square cross-section which are tapered to correspond to the taper of the sockets and are adapted to be driven into the sockets to the depth of about three-eighths of an inch, leaving about one-fourth of an inch at the bottom of the socket unoccupied to permit the insertion of an implement to force the teeth out of the sockets when it is desired to replace damaged teeth with new ones. As best seen in Fig. 2, the inserted ends of the teeth are of substantially the same thickness as the saw, and when the saw is in use the teeth are supported on the sides by the sides of the kerf formed in the stone and are so prevented from being thrown out of alinement with the saw-blade.

The form of blade and tooth herein shown possesses advantages in point of cheapness of manufacture and readiness with which the parts may be assembled. The form of tooth shown is capable of cutting stone upon both strokes of the blade and with rapidity, and whenever a tooth becomes injured it only requires a small loss of time and little labor to remove the damaged tooth and insert a fresh one in lieu thereof. If a tooth becomes broken after the saw has been in service for a sufficient length of time to wear the remaining teeth appreciably, the inserted tooth may be brought into alinement with those already in the saw, the taper of the sockets being so gradual that the depth to which the tooth may be inserted may be varied in a pronounced manner without distorting the saw-blade or applying great force to the tooth.

Having thus described the construction and operation of my invention, what I claim as new, and desire to secure by Letters Patent, is—

A stone-saw comprising a blade having a plurality of slightly-tapered tooth-sockets arranged perpendicular to the edge of the saw and having flat sides, and a plurality of teeth having flat sides fitted in said sockets but not extending to the bottoms thereof.

In testimony that I claim the foregoing as my own I have hereto affixed my signature in the presence of two witnesses.

JOHN F. NEHER.

Witnesses:
M. LUTHER WEST,
BLANCHE BENNETT.